United States Patent [19]

McGill

[11] 3,898,058

[45] Aug. 5, 1975

[54] VACUUM STRIPPING OF HYDROCARBON CONTAMINATED WATER STREAMS

[75] Inventor: James C. McGill, Tulsa, Okla.

[73] Assignee: H-T Management Company, Tulsa, Okla.

[22] Filed: Apr. 12, 1973

[21] Appl. No.: 350,311

[52] U.S. Cl. .............................. 55/50; 55/53; 55/55
[51] Int. Cl. ............................................. B01d 19/00
[58] Field of Search .......... 55/41, 42, 44, 47, 50–53, 55/55; 210/26, 48; 415/121, 182

[56] References Cited
UNITED STATES PATENTS

| | | | |
|---|---|---|---|
| 2,764,533 | 9/1956 | Oetjen et al. | 55/55 X |
| 3,007,417 | 11/1961 | Feltus | 415/182 |
| 3,536,613 | 10/1970 | Kunin et al. | 210/26 |
| 3,617,562 | 11/1971 | Cywin | 210/48 |
| 3,681,028 | 8/1972 | Mason | 55/55 X |

*Primary Examiner*—Charles N. Hart
*Assistant Examiner*—Richard W. Burks

[57] ABSTRACT

Hydrocarbons or other matter which contaminate water streams are removed in a process wherein a vacuum is applied to a contacting vessel in which the contaminated stream has been introduced. There may be packing or trays or other means within the vessel to assist in filming or distributing the liquid for more effective removal of the hydrocarbon contaminates by the vacuum draw. The withdrawn contaminates are then compressed, condensed and separated for removal of gaseous and liquid forms of hydrocarbons. Any water resulting is recycled back to the contacting vessel. An additional embodiment includes the injection of a high vapor pressure stripping gas into the contacting vessel which flows counter-currently to the introduced contaminated water and thus aid in an effective removal of the hydrocarbon therewith. The invention further contemplates a multiple stage system.

12 Claims, 3 Drawing Figures

VACUUM STRIPPING OF HYDROCARBON CONTAMINATED WATER STREAMS

BACKGROUND

The cry for "clean water" is one that now invades every aspect of our civilization and a duty now arises upon individual citizens and industry to take steps to keep clean our air, land, and water. There are few oil refineries, chemical processes, or other related areas where water is not used as a necessary part of the process. Such water is highly likely to become contaminated with hydrocarbon or other similar pollutants which heretofore have been dumped as waste or cleaned only to a limited extent. Current public opinion, governmental regulations and rules now require that such waste stream be placed to an uncontaminated condition, before being placed back into the environment.

Conventional methods of hydrocarbon removal from water usually involve mechanical separation processes and skimming followed by aeration. Such is the case in treatment of domestic sewage. Aeration is for the purpose of adding oxygen to the water which then oxidizes the hydrocarbons to carbon dioxide and water products with the aid of bacteria. Hydrocarbon contaminants of water are typically reported in terms of the amount of oxygen required to oxidize the contaminant with the aid of bacteria. This is normally called "biochemical oxygen demand" or (BOD). Other related terms are "chemical oxygen demand" (COD), and "total organic carbon" (TOC), which all relate to hydrocarbon content of the water relative to the requirements for its removal.

SUMMARY OF THE INVENTION

It is an object of this invention to effect efficient and economical removal of hydrocarbons and other organic materials from water and thus causing considerable reductions in the BOD, COD and TOC requirements. In addition thereto, the processes of this invention are directed to the removal of ammonia and/or hydrogen sulfide which may be present in such feed stream. The recovered hydrocarbons can then be utilized in other hydrocarbon processing facilities or as fuel or disposal as may be necessary. Broadly speaking, the process involves the removal of the hydrocarbon by the application of a vacuum to a contacting vessel in which the contaminated water stream is caused to flow across packing material or trays so as to break it up or film the stream for more efficient gas removal. The term "hydrocarbons" as used here in the specification and claims shall apply to those compounds which are primarily composed of hydrogen and carbon. The term is also applicable to hydrogen and carbon compounds plus other materials within the contaminated water stream which are or include ammonia, chlorine, and/or sulphur.

The removed materials are compressed, condensed and further separated to remove gaseous and/or liquid hydrocarbon from the system.

Another object of the invention is to remove hydrocarbons from contaminated water streams in which a stripping gas is introduced into countercurrent contact with the filming contaminated water stream as an assistance to the vacuum removal process. Typical of such stripping gases are methane, carbon dioxide or air.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
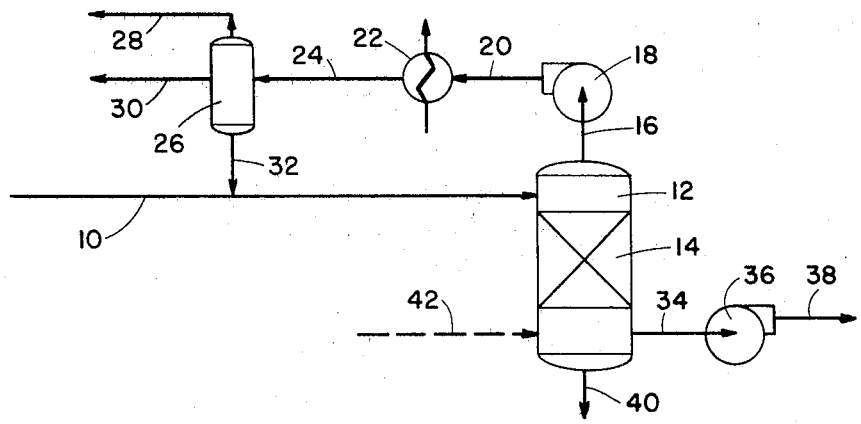
FIG. 1 is a schematic illustration of the invention as a single stage system.

Referring now to FIG. 1, a water stream 10 contaminated with hydrocarbons or the like as described herein, is introduced at the top of contacting vessel 12 within which will be found fractionation tower packing material, such as Rashig Rings or the like or bubble type fractionation trays or other well known liquid-vapor type of contacting devices, all of which are well known to those skilled in the art. Suffice it to say that such packing or trays or other devices are for the purposes of filming or distribution of the water stream to effect efficient vacuum removal of the contaminates. Outlet 16 at the upper end of the contacting vessel 12 is connected to the input of vacuum pump 18, thereby withdrawing volatile hydrocarbon components, the compressed outlet 20 of which is fed to a condenser 22 and thence via stream 24 to a separating vessel 26. The separating vessel is adapted to release the contaminates in gaseouus form via outlet 28 or in liquid form via outlet 30 with remaining liquid matter, primarily contaminated water, being recycled via stream 32 to the inlet stream 10.

In the contacting vessel there may be some separated liquid hydrocarbons or other matter which may need to be removed by skimming or other well known means via outlet conduit 34 by a pump 36 to outlet 38 for use or disposal. Clean water is removed from the contacting vessel via outlet 40.

In one embodiment of the invention it involves the addition of stripping gas into the vessel via conduit 42 in which the gas will thereby pass countercurrently to the filming liquid and thus assist in the separation.

Figure 2:
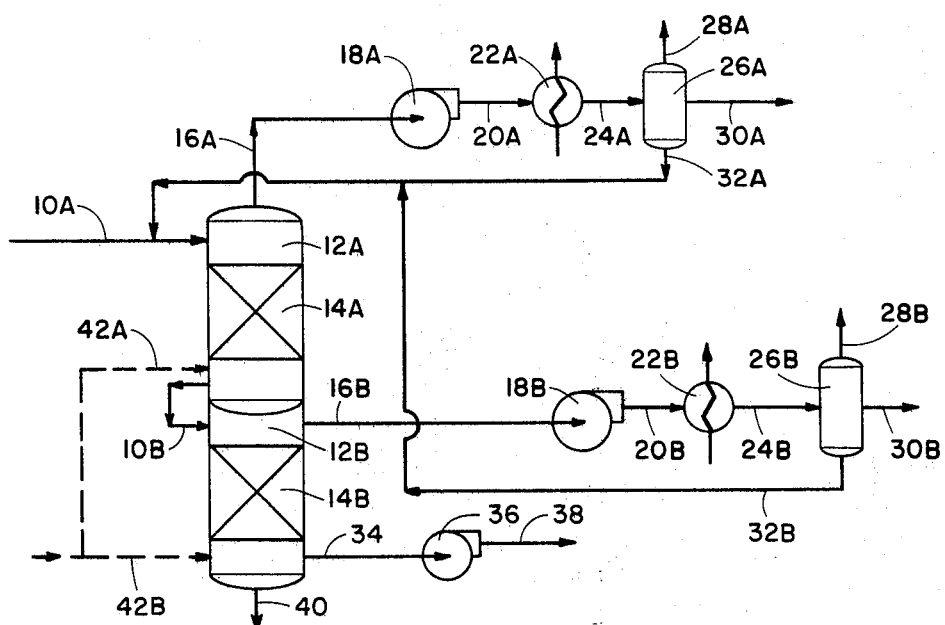
FIG. 2 is a schematic illustration of the invention depicting a two-stage system.

Referring now to FIG. 2, the system of this invention is described with regard to a two-stage process and like numerals as used in FIG. 1 with alphabetical suffixes wherein "A" refers to essentially stage 1 while "B" refers to stage 2, where applicable. Additional stages can be included.

EXAMPLES OF USE

One application of the invention is for the removal of hydrocarbon components from water streams resulting from crude oil desalting operations.

The water stream effluent therefrom typically leaves the desalting operation at a temperature as for example within the range of 180°F. to 200°F. To be applicable as the input stream 10 of the process disclosed herein the stream should be cooled to a temperature, possibly 70° F. to 120° F. A preliminary separation prior to introduction into the process of this invention may be necessary as some hydrocarbons, normally dissolved in the water stream, will become insoluble when the temperature is lowered and can hence be easily removed. This reduces the hydrocarbon removal load from the vacuum stream, but is not a critical limitation, however, as sufficient results can occur by direct feeding of the cooled stream into the contacting vessel 12.

Figure 3:
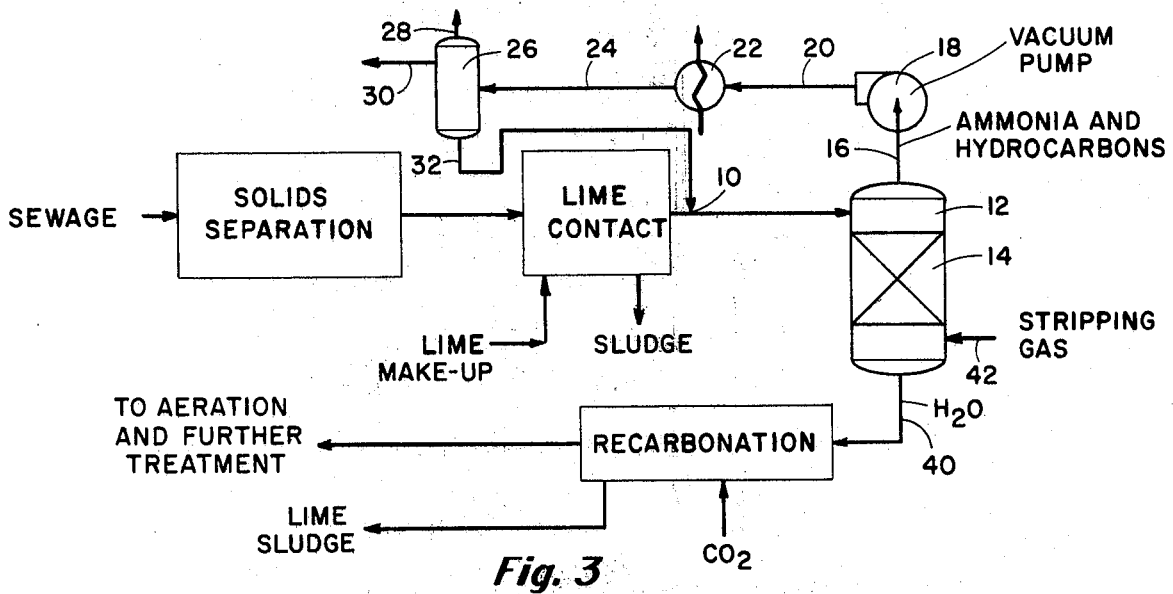
FIG. 3 is a schematic illustration of the invention as applied to sewage water clarification.

Another application is the applicability to the treatment of domestic sewage and can best be described with reference to FIG. 3. Referring to this illustration, the effluent from a primary clarifier goes directly to a lime contact raising the pH of the water to about 11. The resulting precipitate would remove phosphates and some biological sludge. The effluent water therefrom is then caused to flow to a vacuum stripping tower in a manner heretofore disclosed in this invention. With the utilization of high vacuum within the range of 5 mm Hg abs. to 100 mm Hg abs., and possibly the addition of stripping gas, additional hydrocarbon components within the water would be removed along with a major portion of the ammonia. Because of the high pH, ammonia from the ionized stage converts to free ammonia absorbed in the water and is thus assisted in its removal by vacuum. The effluent from the vacuum contacting vessel would have less hydrocarbon reflecting a lowered biochemical oxygen demand (BOD) and less ammonia than the plant influent. The contacting vessel effluent water could then be recarbonated to a lower pH, and effect lime recovery which may be recycled to the lime contacting process. Utilizing such an initial separation of the contaminated water will produce a lower load on any further separation processes as, for example, adsorption systems, and hence considerably reduce cost of domestic sewage treatment. An alternate approach is to initially remove the hydrocarbon components by vacuum removal within the concepts of this invention without having an initial lime contact. As a result, there will be a considerable decrease in the amount of ammonia which could be removed. The ammonia is later removed by conventional methods or by additional vacuum stripping after raising the pH of the water to a basic condition.

In some processes, e.g., where $H_2S$ is to be removed as a water contaminate or when the contaminate is $CO_2$, the pH of the water is lowered to an acid condition prior to vacuum stripping.

Figure 4:
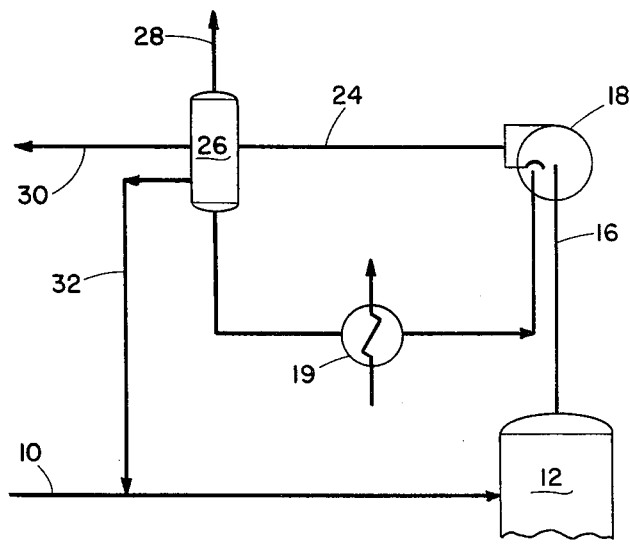
Figure 5:
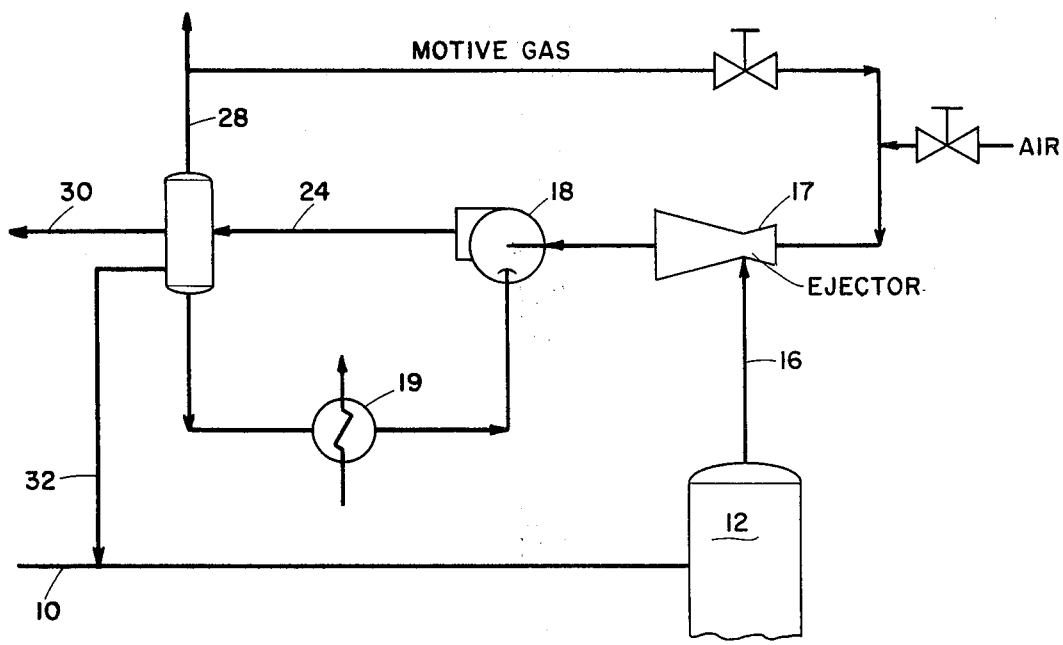

The vacuum creating means represents an important aspect of this invention. Because the stream to be withdrawn is largely water saturated it is preferred that a vacuum pump known as a "Liquid Ring" type be used as the means 18. Typical of those for use are manufactured and sold by Nash Engineering of Norwalk, Connecticut. Because of this style pump there will be instances where the separate condenser 22 will not be necessary since condensation will occur in the liquid seal of the pump. A seal water exchanger 19 may then be necessary. This is schematically shown in FIG. 4. Where low vacuum (e.g., below 1 inch Hg abs.) service is required a liquid ring vacuum pump-air ejector or eductor combination 17 is typically required as shown in FIG. 5. The motive air stream may be either the separating vessel gas stream and/or atmospheric air, the latter applicable if the gaseous portion is to be subsequently burned.

I claim:

1. A process of removing hydrocarbon contaminates from a water stream comprising:
    maintaining said stream at a temperature of at least 40°F.;
    introducing said contaminated stream into a contacting vessel;
    maintaining a vacuum in said contacting vessel by a vacuum pump wherethrough essentially said hydrocarbons plus some water are withdrawn as vapors, and disposed;
    introducing a high vapor pressure stripping gas into said vessel in countercurrent contact with said contaminated stream; and
    removing substantially contaminate free water from said contacting vessel.

2. The process of claim 1 including filming said contaminated stream across packing material in said vessel.

3. The process of claim 1 wherein said contaminate includes a weak acid, the step of lowering the pH of said stream to an acid condition prior to its introduction into said contacting vessel.

4. The process of claim 3 wherein said weak acid is hydrogen sulfide.

5. The process of claim 3 wherein said weak acid is carbon dioxide.

6. The process of claim 1 wherein said contaminate includes a basic compound, the step of raising the pH of said stream to a base condition prior to its introduction into said contacting vessel.

7. The process of claim 6 wherein said basic compound is ammonia.

8. The process of claim 1 wherein said water stream is caused to flow through a first contacting vessel to which said vacuum is applied and thence to a second contacting vessel to which additional vacuum is applied.

9. A process of removing hydrocarbon contaminates from a water stream comprising:
    maintaining said stream at a temperature of at least 40° F.;
    introducing said contaminated stream into a contacting vessel;
    maintaining a vacuum in said contacting vessel by a liquid ring vacuum pump wherethrough essentially said hydrocarbons plus some water are withdrawn as vapors, and compressed:
    causing those of said withdrawn vapors, that can, to essentially condense in said pump liquid;
    separating and removing gaseous and/or liquid hydrocarbons from any condensed water;
    recycling and cooling a portion of said condensed water to said pump; and
    recycling another portion of said condensed water to said contaminated stream or to said contacting vessel;
    and removing contaminate free water from said contacting vessel.

10. The process of claim 9 wherein said vacuum is maintained by:
    causing motive gas to be drawn by said vacuum pump through an ejector;
    withdrawing vapors from said contacting vessel by the action of the vacuum created by said ejector.

11. The process of claim 10 wherein said motive gas is separated gaseous hydrocarbons and/or air.

12. The process of claim 9 including the step of introducing a high vapor pressure stripping gas into said vessel in countercurrent contact with said contaminated stream.

* * * * *